(12) United States Patent
Singer et al.

(10) Patent No.: US 9,374,696 B2
(45) Date of Patent: Jun. 21, 2016

(54) AUTOMATED PROXIMATE LOCATION ASSOCIATION MECHANISM FOR WIRELESS EMERGENCY SERVICES

(71) Applicants: Andrew Singer, Seattle, WA (US); Don Mitchell, Bellevue, WA (US); Firdaus Aryana, Seattle, WA (US); Roger Marshall, Auburn, WA (US)

(72) Inventors: Andrew Singer, Seattle, WA (US); Don Mitchell, Bellevue, WA (US); Firdaus Aryana, Seattle, WA (US); Roger Marshall, Auburn, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/705,312

(22) Filed: Dec. 5, 2012

(65) Prior Publication Data

US 2013/0143518 A1 Jun. 6, 2013

Related U.S. Application Data

(60) Provisional application No. 61/566,923, filed on Dec. 5, 2011.

(51) Int. Cl.
*H04M 11/04* (2006.01)
*H04W 4/22* (2009.01)
(Continued)

(52) U.S. Cl.
CPC .............. *H04W 4/22* (2013.01); *G01S 5/0257* (2013.01); *H04W 4/02* (2013.01); *H04W 64/00* (2013.01); *H04W 76/007* (2013.01)

(58) Field of Classification Search
CPC ......... H04W 4/02; H04W 4/22; H04W 68/04; H04W 76/007; H04W 4/185; H04L 67/18; H04L 67/1021; G01S 5/02

USPC .............. 455/404.1, 404.2, 521, 456.1–456.6
See application file for complete search history.

(56) References Cited

U.S. PATENT DOCUMENTS 4,625,081 A 11/1986 Lotito
5,611,050 A 3/1997 Theimer
(Continued)

FOREIGN PATENT DOCUMENTS

DE WO/2004021726 3/2004
WO WO/03039009 5/2003
(Continued)

OTHER PUBLICATIONS

International Search Report received in PCT/US12/067857 dated Feb. 20, 2013.
(Continued)

*Primary Examiner* — Charles Appiah
*Assistant Examiner* — Edward Zhang
(74) *Attorney, Agent, or Firm* — Tarolli, Sundheim, Covell & Tummino LLP

(57) ABSTRACT

Automatic Location Information (ALI) data that is representative of a landline address is digitally retrieved, and automatically transferred to an emergency call taker over a wireless system emergency network. Importantly, the ALI information is determined based on association to a proximate location. Before an emergency call is initiated, additional environmental information, such as a RFID tag, location beacon, WiFi access point, Bluetooth device, or other communication signal with a known location, is included in the wireless session data exchange, used to match one or more location inputs to a fixed civic location (street address) which is used to dispatch emergency responders. Alternatively, the mechanism matches to a precise geodetic location (e.g., where no civic location is available).

7 Claims, 5 Drawing Sheets

(51) Int. Cl.
*H04W 4/02* (2009.01)
*H04W 64/00* (2009.01)
*G01S 5/02* (2010.01)
*H04W 76/00* (2009.01)

(56) References Cited

U.S. PATENT DOCUMENTS

| | | |
|---|---|---|
| 5,712,900 A | 1/1998 | Maupin |
| 5,937,344 A | 8/1999 | Zicker |
| 6,067,045 A | 5/2000 | Castelloe |
| 6,121,923 A | 9/2000 | King |
| 6,138,026 A * | 10/2000 | Irvin ............................ 455/456.3 |
| 6,195,555 B1 | 2/2001 | Dent |
| 6,243,039 B1 | 6/2001 | Elliot |
| 6,275,937 B1 | 8/2001 | Hailpern |
| 6,397,074 B1 | 5/2002 | Pihl |
| 6,438,223 B1 | 8/2002 | Eskafi |
| 6,535,743 B1 | 3/2003 | Kennedy, III |
| 6,556,816 B1 | 4/2003 | Gafrick |
| 6,675,017 B1 | 1/2004 | Zellner |
| 6,721,396 B2 | 4/2004 | Chin |
| 6,771,742 B2 | 8/2004 | McCalmont |
| 6,813,499 B2 | 11/2004 | McDonnell |
| 6,865,266 B1 | 3/2005 | Pershan |
| 6,925,504 B1 | 8/2005 | Liskov |
| 7,013,148 B1 | 3/2006 | Ganesh |
| 7,031,724 B2 | 4/2006 | Ross |
| 7,194,249 B2 | 3/2007 | Phillips |
| 7,516,198 B1 | 4/2009 | Appala |
| 7,526,563 B2 | 4/2009 | Ingimundarson |
| 7,617,287 B2 | 11/2009 | Vella |
| 7,627,331 B2 | 12/2009 | Winterbottom |
| 7,684,782 B2 | 3/2010 | Ashley |
| 7,822,391 B1 | 10/2010 | Delker |
| 7,895,263 B1 | 2/2011 | Kirchmeier |
| 8,364,117 B2 * | 1/2013 | Hawkins .................... 455/404.2 |
| 8,406,730 B1 | 3/2013 | English |
| 8,478,304 B1 * | 7/2013 | David et al. ................ 455/456.5 |
| 2002/0002036 A1 | 1/2002 | Uehara |
| 2002/0055924 A1 | 5/2002 | Liming |
| 2002/0086659 A1 | 7/2002 | Lauper |
| 2002/0099802 A1 | 7/2002 | Marsh |
| 2002/0111159 A1 | 8/2002 | Faccin |
| 2002/0113797 A1 | 8/2002 | Potter |
| 2002/0136364 A1 | 9/2002 | Stumer |
| 2002/0141386 A1 | 10/2002 | Minert |
| 2002/0154221 A1 | 10/2002 | Ishimaru |
| 2002/0174073 A1 | 11/2002 | Nordman |
| 2003/0063714 A1 | 4/2003 | Stumer |
| 2003/0063730 A1 | 4/2003 | Woodring |
| 2003/0069002 A1 | 4/2003 | Hunter |
| 2003/0081752 A1 | 5/2003 | Trandal |
| 2003/0081754 A1 | 5/2003 | Esparza |
| 2003/0115261 A1 | 6/2003 | Mohammed |
| 2003/0125021 A1 | 7/2003 | Tell |
| 2003/0125493 A1 | 7/2003 | Phelan |
| 2003/0163483 A1 | 8/2003 | Zingher |
| 2003/0186709 A1 | 10/2003 | Rhodes |
| 2003/0187803 A1 | 10/2003 | Pitt |
| 2003/0222901 A1 | 12/2003 | Houck |
| 2004/0064500 A1 | 4/2004 | Kolar |
| 2004/0070515 A1 | 4/2004 | Burkley |
| 2004/0093217 A1 | 5/2004 | Yeh |
| 2004/0107143 A1 | 6/2004 | Niemi |
| 2004/0150518 A1 | 8/2004 | Phillips |
| 2004/0152493 A1 | 8/2004 | Phillips |
| 2004/0156394 A1 | 8/2004 | Westman |
| 2004/0157175 A1 | 8/2004 | Matsumoto |
| 2004/0184584 A1 | 9/2004 | McCalmont |
| 2004/0190497 A1 | 9/2004 | Knox |
| 2004/0203568 A1 | 10/2004 | Kirtland |
| 2004/0203876 A1 | 10/2004 | Drawert |
| 2004/0203919 A1 | 10/2004 | Ross |
| 2004/0242191 A1 | 12/2004 | Hossain |
| 2004/0247090 A1 | 12/2004 | Nurmela |
| 2005/0003797 A1 | 1/2005 | Baldwin |
| 2005/0003835 A1 | 1/2005 | Riise |
| 2005/0030977 A1 | 2/2005 | Casey |
| 2005/0031095 A1 | 2/2005 | Pietrowicz |
| 2005/0039135 A1 | 2/2005 | Othmer |
| 2005/0047399 A1 | 3/2005 | Lee |
| 2005/0144322 A1 | 6/2005 | Miyajima |
| 2005/0148346 A1 | 7/2005 | Maloney |
| 2005/0148353 A1 | 7/2005 | Hicks, III |
| 2005/0181805 A1 | 8/2005 | Gallagher |
| 2005/0186948 A1 | 8/2005 | Gallagher |
| 2005/0188078 A1 | 8/2005 | Kotzin |
| 2005/0190892 A1 | 9/2005 | Dawson |
| 2005/0195954 A1 | 9/2005 | Klein |
| 2005/0202799 A1 | 9/2005 | Rollender |
| 2005/0213537 A1 | 9/2005 | Ingimundarson |
| 2005/0272424 A1 | 12/2005 | Gallagher |
| 2005/0272449 A1 | 12/2005 | Gallagher |
| 2005/0287979 A1 | 12/2005 | Rollender |
| 2006/0044407 A1 | 3/2006 | Barbeau |
| 2006/0073812 A1 | 4/2006 | Punaganti |
| 2006/0079236 A1 | 4/2006 | Del Pino |
| 2006/0099935 A1 | 5/2006 | Gallagher |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0205383 A1 | 9/2006 | Rollender |
| 2006/0236258 A1 | 10/2006 | Othmer |
| 2006/0293024 A1 | 12/2006 | Benco |
| 2007/0008885 A1 | 1/2007 | Bonner |
| 2007/0027997 A1 | 2/2007 | Polk |
| 2007/0060097 A1 | 3/2007 | Edge |
| 2007/0104183 A1 | 5/2007 | Bakke |
| 2007/0190968 A1 | 8/2007 | Dickinson |
| 2007/0201623 A1 | 8/2007 | Hines |
| 2007/0202844 A1 | 8/2007 | Wilson |
| 2007/0218871 A1 | 9/2007 | Bonner |
| 2007/0238448 A1 | 10/2007 | Gallagher |
| 2008/0045250 A1 | 2/2008 | Hwang |
| 2008/0080488 A1 | 4/2008 | Marsico |
| 2008/0192731 A1 | 8/2008 | Dickinson |
| 2008/0227463 A1 * | 9/2008 | Hizume et al. ............. 455/456.1 |
| 2008/0268809 A1 | 10/2008 | Busin |
| 2009/0158404 A1 * | 6/2009 | Hahn .................... H04L 63/083 726/5 |
| 2009/0215427 A1 | 8/2009 | Hawkins |
| 2009/0237210 A1 * | 9/2009 | Ciesla et al. ................. 340/10.1 |
| 2010/0021013 A1 | 1/2010 | Gale |
| 2010/0233991 A1 | 9/2010 | Crawford |
| 2010/0262668 A1 | 10/2010 | Piett |
| 2011/0137549 A1 | 6/2011 | Gupta |
| 2011/0151837 A1 | 6/2011 | Winbush |
| 2011/0205053 A1 | 8/2011 | Chen |
| 2011/0207429 A1 | 8/2011 | Maier |
| 2012/0083285 A1 * | 4/2012 | Shatsky et al. ............. 455/456.1 |

FOREIGN PATENT DOCUMENTS

| | | |
|---|---|---|
| WO | WO/2004060292 | 12/2004 |
| WO | WO2007/025227 | 3/2007 |
| WO | WO2009/210868 | 2/2009 |
| WO | WO2009/105603 | 8/2009 |

OTHER PUBLICATIONS

International Search Report received in PCT/US2012/067857 dated Feb. 20, 2013.
International Search Report received in PCT/US2012/67689 dated Feb. 22, 2013.
International Search Report received in PCT/US2012/066313 dated Feb. 4, 2013.
International Search Report received in PCT/US2012/067932 dated Feb. 6, 2013.
Winterbottom et al., GEOPRIV PIDF-LO Usage Clarification, Considerations and Recommendations, Geopriv, Feb. 12, 2005, pp. 1-19.
Linden, Greg, Geeking with Greg, Exploring the Future of Personalized Information, glinden.blogspot.com, pp. 1-2.

(56) References Cited

OTHER PUBLICATIONS

PCT Notification of Transmittal of the International Search Report and the Written Opinion of the International Searching Authority received in PCTUS2007/00039, Feb. 14, 2008.

Peterson et al., "A Presence-Based GEOPRIV Location Object Format; rfc4119,txt," Neustar, Dec. 1, 2005, pp. 1-23.

Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.

Berners-Lee, et al., "Uniform Resource Identifier (URI) Generic Standard, Internet Engineering Task Force," Day Software, Jan. 1, 2005, pp. 1-61.

European Search Report in Appl. No. EPO7 71 6216 dated Dec. 12, 2009.

Zehua et al., "On Querying Geospatial and Georeferenced Metadata Resources in G-Portal," IEEE Comp. SOC, May 31, 2003, pp. 245-255.

http://en.wikpedia.org/wiki/imsi, Wikipedia Encyclopedia, International Mobile Subscriber Identity, pp. 1-4, printed on Sep. 4, 2008.

PCT Notification of Transmittal of the International Search Report and the Written Opinion of the International Searching Authority received in PCTUS2006/27658, Feb. 13, 2007.

PCT International Preliminary Report on Patentabilty received in PCT/US2012/67857 dated Nov. 22, 2013.

Extended Search Report in European Patent Appl. No. 12855807.9 dated Jul. 2, 2015.

\* cited by examiner

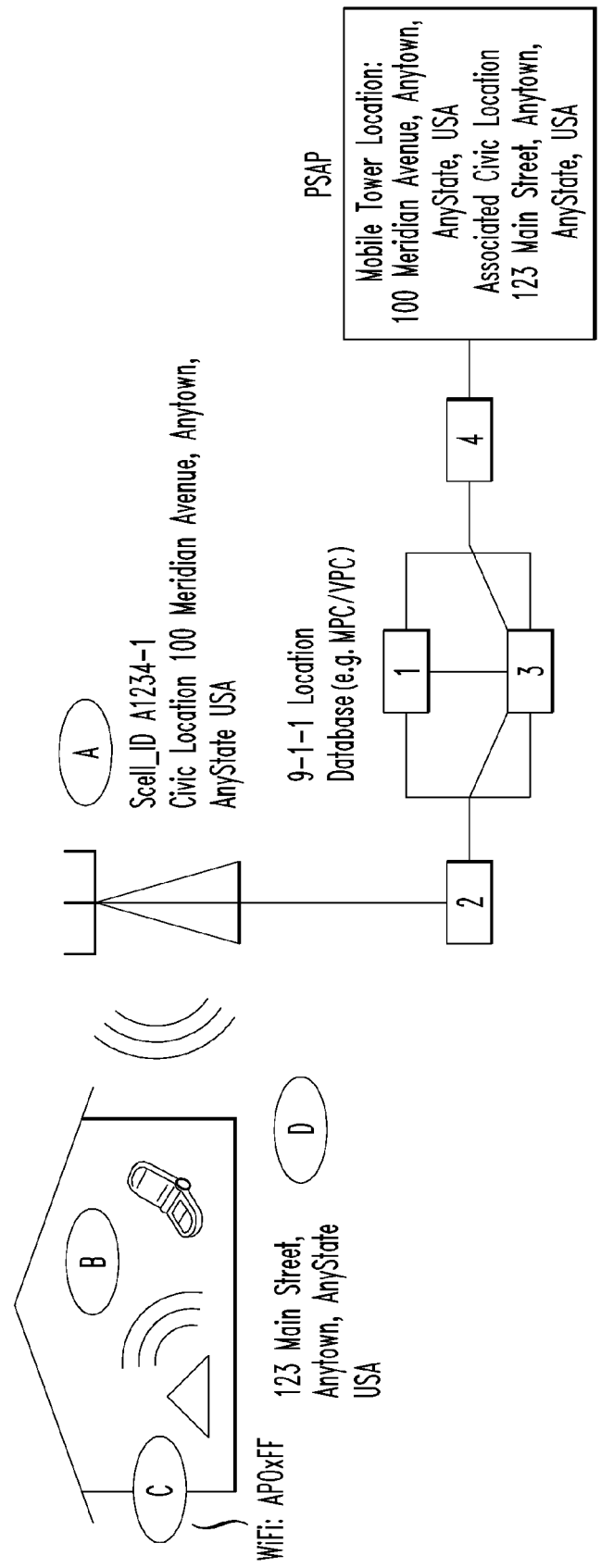

*FIG. 1A*

| Scell_ID (A) | Cell Site Provisioned Location | SNR Threshold | Lat/Lon (B) | Uncertainty | Loc. Ref. (C) | SNR Tolrance | Fixed Civic Location (D) |
|---|---|---|---|---|---|---|---|
| A1234-1 | 100 Meridan Avenue, Anytown, AnyState USA | 30dB | 44.14, -123.23 | 50m | WiFi AP0xFF | 37dB | 123 Main Street, Anytown, AnyState USA |
| A1234-1 | 100 Meridan Avenue, Anytown, AnyState USA | 30dB | 44.12, -123.19 | 50m | WiFi AP0xFA | 37dB | 125 Main Street, Anytown, AnyState USA |
| A1234-1 | 100 Meridan Avenue, Anytown, AnyState USA | 30dB | 44.12, -123.19 | 50m | WiFi AP0x2C | 37dB | 44.1267890, -123.1926543 |

TABLE 1

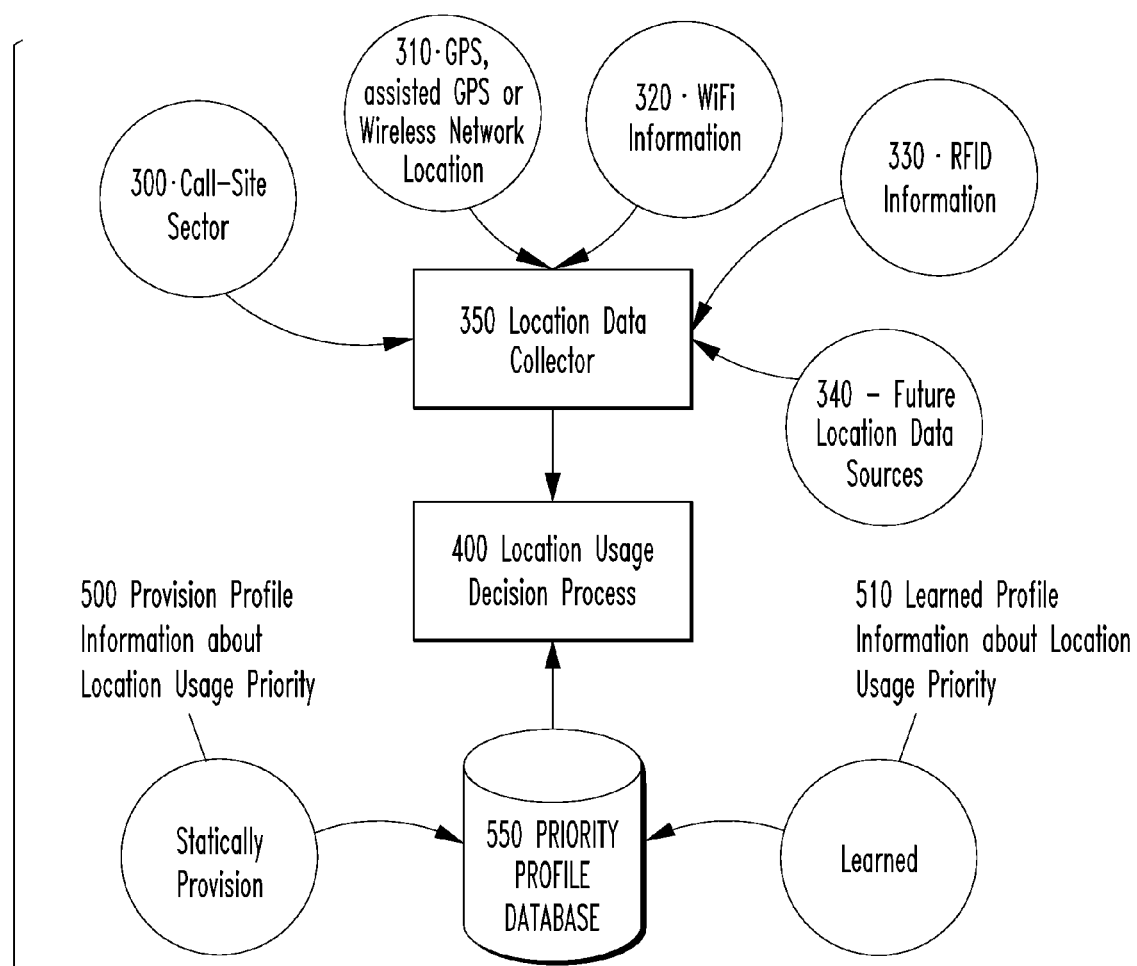

During an emergency services call, the 350 location data collector retrieves and processes information from some or all of the available sources.

- 300 – Cell Site Sector
- 310 – Calculated position from Assisted GPS, GPS, or Network Based Positioning
- 320 – WiFi Data
- 330 – RFID Data
- 340 – Future Location data sources The 400 Location Usage Decision Process uses the processed data from 350 Location Data Collector and determines location to be delivered as part of the 911 incident data by using information from the 550 Priority Profile Database which has information which is either 500 Provisioned Profile information about Location Usage Priorty or 510 Learned Profile information about location Usage Priority.

FIG. 3

AUTOMATED PROXIMATE LOCATION ASSOCIATION MECHANISM FOR WIRELESS EMERGENCY SERVICES

The present invention claims priority from U.S. Provisional No. 61/566,92, entitled "Automated Proximate Location Association Mechanism for Wireless Emergency Services", to Singer et al., the entirety of which is explicitly incorporated herein by reference.

BACKGROUND OF THE INVENTION

1. Field of the Invention

This invention relates generally to telecommunications. More particularly, it relates to wireless telecommunications and public safety.

2. Background of Related Art

Wireless emergency calls often are made from residences that no longer have fixed wireline service. Wireless calls don't have the equivalent fixed landline civic location information available that was expected to exist in the fixed wireline case, and so are limited to the current Cell site ID information and/or precise position information during or after the call is delivered to the PSAP. Precise location information is sometimes insufficient to provide a definitive civic location (address) for dispatching an emergency response. A solution is needed to provide a fixed landline equivalent civic location in the case where a mobile phone is used as a replacement for fixed landline service.

SUMMARY OF THE INVENTION

A physical address-determining system provisioned with associated location information to provide reliable location information of a wireless caller to a requesting party in accordance with the present invention comprises retrieving a provisioned physical address of a caller. Current proximate location information is obtained from the caller. Automatic location information (ALI) information is determined based on a best match to pre-provisioned association to the proximate location information.

BRIEF DESCRIPTION OF THE DRAWINGS

Features and advantages of the present invention become apparent to those skilled in the art from the following description with reference to the drawings:

FIG. 1 shows exemplary short call flow for retrieval of ALI information determined based on association to a proximate location, in accordance with the principles of the present invention.

FIG. 3 shows a system for collecting, retrieving, and processing information from a plurality of available resources.

DETAILED DESCRIPTION OF ILLUSTRATIVE EMBODIMENTS

Figure 2A:
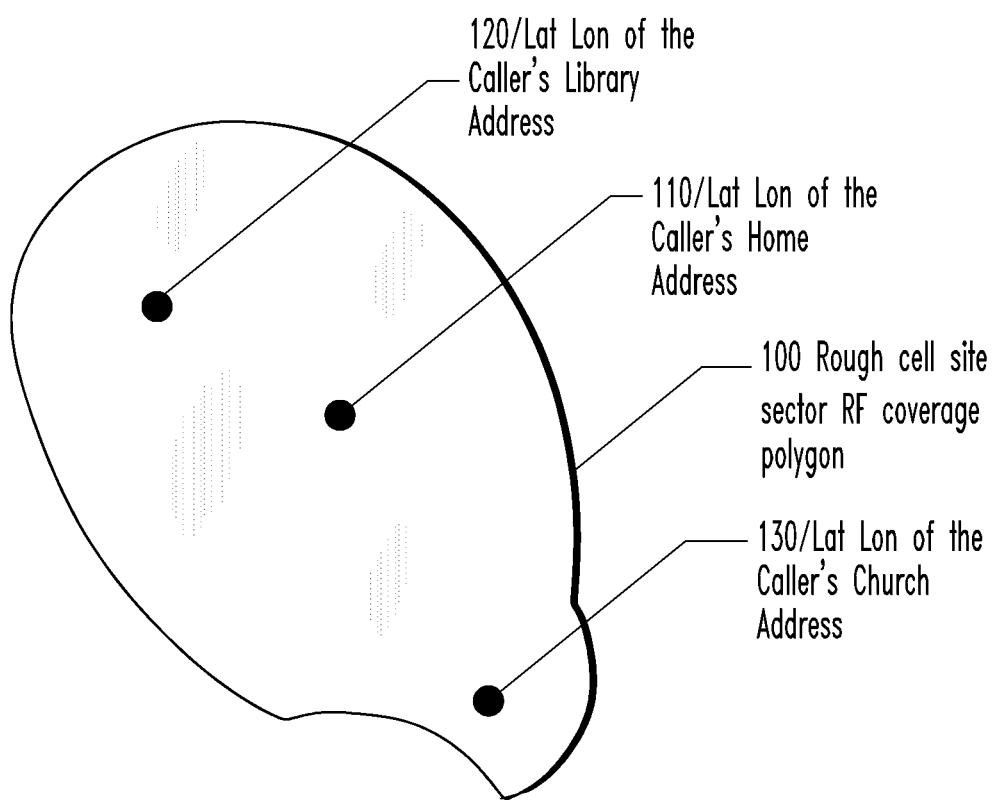
FIGS. 2A and 2B are two exemplary use cases of proximate location for wireless emergency services, in accordance with the principles of the present invention.

The present invention provides digital retrieval of Automatic Location Information (ALI) data that is representative of a landline address, with automatic transfer of the same to an emergency call taker over a wireless system emergency network. Importantly, in accordance with the principles of the present invention, the ALI information is determined based on association to a proximate location.

In accordance with the invention, before an emergency call is initiated, additional environmental information, such as a RFID tag, location beacon, WiFi access point, Bluetooth device, or other communication signal with a known location, is included in the wireless session data exchange, which is then used to match one or more location inputs to a fixed civic location (street address) which is used to dispatch emergency responders. Alternatively, in another aspect of the invention, a match may be searched and made to a precise geodetic location (e.g., where no civic location is available).

During or after an emergency call has been initiated, additional location information is received, and/or queried for, that is used by an emergency 9-1-1 location database (e.g., MPC/VPC/LIS) to associate a provisioned civic address representative of the fixed location that the call is being initiated from (e.g., residence, enterprise, landmark, etc.). During the call, additional information is received, and/or retrieved, that when compared alongside other key information yields a reliably probable associated fixed location that the PSAP can successfully be dispatched to.

The present invention provides a landline replacement enabler—or location information adjunct, which is helpful in many high-density-living situations, e.g., for high rise apartment dwellers. In accordance with the invention, upon receipt of a wireless emergency call, emergency responders can access a separate proximity parameter matching database, and based on proximity parameter matching, a "better" LVF valid address can be presented to the call taker.

FIG. 1 shows exemplary short call flow for retrieval of ALI information determined based on association to a proximate location, in accordance with the principles of the present invention.

In particular, as shown in step 1 of FIG. 1, a location from which a wireless emergency call may be placed is updated with a location that is associated with a fixed environment, and tied to a location reference—ahead of an emergency call.

For instance, FIG. 1A shows several entries in an exemplary proximate location database. In the example of, FIG. 1A an association is made between cell ID (step A in FIG. 1), a physical address of the cell site provisioned location, a signal-to-noise ratio (SNR) threshold, a lat/lon (step B in FIG. 1), a distance uncertainty, a WiFi or other RF location reference (step C in FIG. 1), an SNR tolerance, and a fixed civic location of the wireless device (step D in FIG. 1).

In step 2 of FIG. 1, a wireless emergency call is initiated, and provides proximate location information to the 9-1-1 location database.

In step 3, a 9-1-1 location database processes location retrieved with proximate location information and associates a fixed civic location.

In step 4, a wireless emergency call is presented to the public safety access point (PSAP).

Figure 2B:
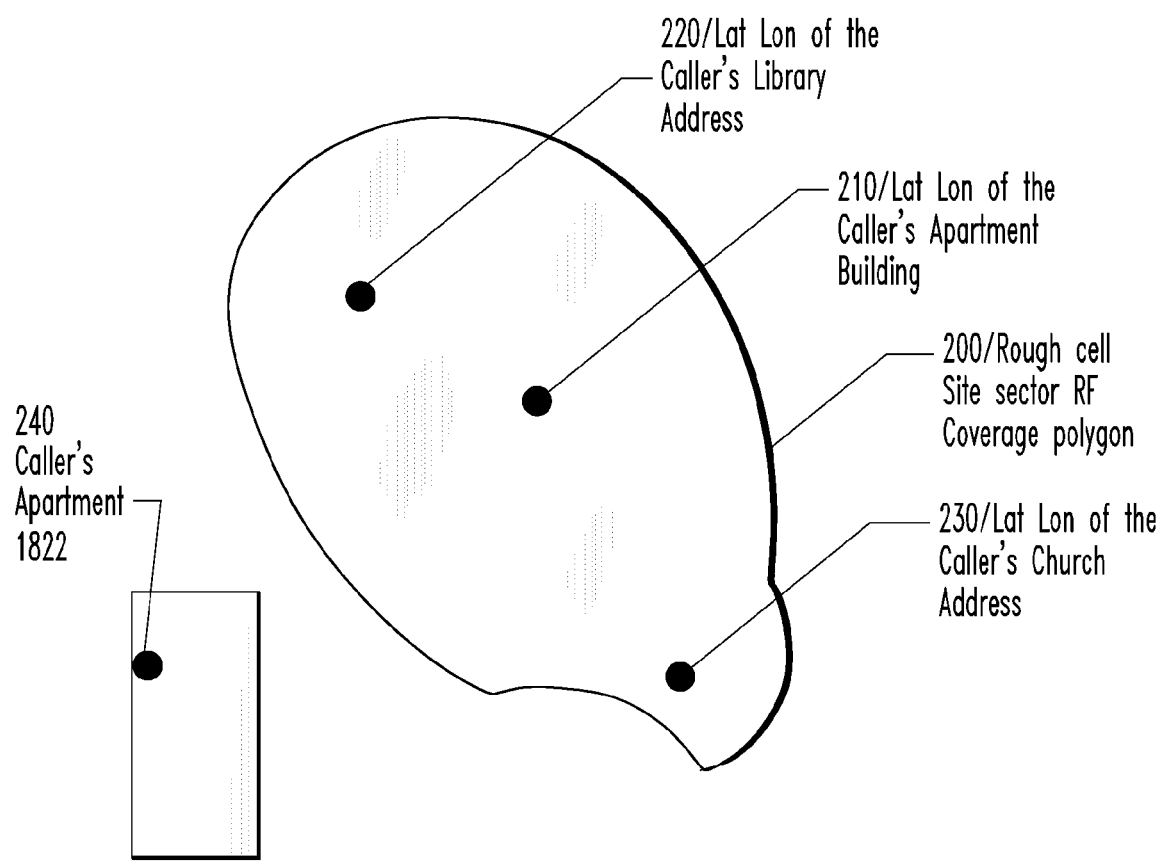

FIGS. 2A and 2B are two exemplary use cases of proximate location for wireless emergency services, in accordance with the principles of the present invention.

In particular, as shown in the exemplary use case of FIG. 2A, a calling wireless device calls emergency services, e.g., "9-1-1".

In the given example, the latitude/longitude (lat/lon) of the calling device owner's house 110 is within a cell site sector rough polygon 100. The lat/lon of the caller's library address 120 is also within the cell site sector rough polygon 100. And in this particular example, the lat/lon of the caller's church 130 is also within the cell site sector rough polygon 100. Furthermore in this example, there is no WiFi or RFID information available. The day/time is, e.g., Sunday afternoon @3 pm.

In such a case, a stored historical location profile for this user indicates a 95% chance (probability) that the user of that given wireless device, at 3 pm on a Sunday, is at the caller's provisioned home address 110. However, because this address is provided via the inventive cell site sector association to a location profile, the returned address of the emergency call is provided with information indicating its reliability, e.g., "Home address information is provided to the Emergency Call Processing System with a 60% Confidence".

But in accordance with the present invention, with additional associated location information, a more precise lat/lon may be calculated, and delivered back to the requesting system. For example, here the precise lat/lon intersects most completely with the rough area of what is provisioned as the caller's church 130. And because in accordance with the principles of the present invention this is a precise lat/lon association to location profile, the respond-to address may be provided more accurately to emergency personnel as, e.g., "Lat/lon & Church address information is provided to the Emergency Call Processing System with a 95% Confidence".

In another use case shown in FIG. 2B, a calling wireless device near an apartment building calls emergency services, e.g., "9-1-1".

In particular, as shown in FIG. 2B, a given wireless device places a call to emergency services, e.g., a "9-1-1" call. In this example the reported lat/lon of the call is placed at the caller's apartment building 210, which is within a cell site sector rough polygon 200. Also the lat/lon of the caller's library 220 is within the cell site sector rough polygon 200, and the lat/lon of the caller's church 230 is within the cell site sector rough polygon 200. And there is WiFi information available, but no RFID information available. The day/time is Sunday afternoon @3 pm.

In such a use case, the user's stored historical location profile indicates a 95% chance that the user is at the caller's apartment building 210 at 3 pm on Sunday. However, because this is a cell site sector association to location profile, the reliability of the location information may be reported to the requesting system as, e.g., "Home address information is provided to the Emergency Call Processing System with a 60% Confidence".

A precise lat/lon is calculated and delivered back to the system, and the precise lat/lon intersects most completely with the rough area of the caller's apartment building 210. Because this is a precise lat/lon association to location profile, the "Lat/lon & caller's apartment address information 210 is provided to the Emergency Call Processing System". The WiFi access point MAC [Media Access Control] address information is gathered, and delivered back to the system. The WiFi access point MAC addresses lat/lon indicates a most likely intersection with a caller's apartment 1822 on the 18$^{th}$ floor 240.

Because this is a WiFi association to location profile, the reliability of the location may be reported along with a statement such as, e.g., "Calculated Lat/lon from the Wireless phone system, and the apartment address & apartment number information from the location profile is provided to the Emergency Call Processing System".

While the invention has been described with reference to the exemplary embodiments thereof, those skilled in the art will be able to make various modifications to the described embodiments of the invention without departing from the true spirit and scope of the invention.

What is claimed is:

1. A physical address-determining system provisioned with associated location information to provide location information of a wireless caller device to a requesting party of a reported reliability, comprising:

retrieving a historical physical address profile of said wireless caller device, said historical physical address profile including street address information together with an identity of at least one associated communication signal having a known location, said associated communication signal being received in a local environment of said wireless caller device while at previous physical address locations;

obtaining a current proximate location from said wireless caller device that characterizes an identifier (ID) of a current serving cell of said wireless caller device, wherein said address profile of said wireless device includes at least two previous physical addresses for said wireless device mapped to the ID of said current serving cell and a time associated with each of the at least two physical addresses;

determining automatic location information (ALI) data based on a best match of said current proximate location to both a one of said at least two previous physical addresses and said associated time in said historical physical address profile and said identity of said at least one associated communication signal received in said local environment, wherein said ALI data includes a fixed civic location and a confidence value characterizing a probability that said wireless device is located at said fixed civic location; and reporting a reliability of said determined ALI data to said requesting party based on said best match, wherein said reliability includes data characterizing said confidence value.

2. The physical address-determining system provisioned with associated location information to provide location information of a wireless caller to a requesting party of a reported reliability according to claim 1, wherein:

said fixed civic location is a best-guess fixed civic location (street address) used to dispatch an emergency responder.

3. The physical address-determining system provisioned with associated location information to provide location information of a wireless caller to a requesting party of a reported reliability according to claim 1, wherein:

said historical physical address profile is provisioned before an emergency call is initiated by said wireless caller device.

4. The physical address-determining system provisioned with associated location information to provide location information of a wireless caller to a requesting party of a reported reliability according to claim 1, wherein:

a given one of said at least two previous physical addresses is further associated with an identity of an RFID tag.

5. The physical address-determining system provisioned with associated location information to provide location information of a wireless caller to a requesting party of a reported reliability according to claim 1, wherein:

a given one of said at least two previous physical addresses is further associated with an identity of a WiFi access point.

6. The physical address-determining system provisioned with associated location information to provide location information of a wireless caller to a requesting party of a reported reliability according to claim 1, wherein:

a given one of said at least two previous physical addresses is further associated with an identity of a Bluetooth device.

7. The physical address-determining system provisioned with associated location information to provide location information of a wireless caller to a requesting party of a reported reliability according to claim 1, wherein:

said wireless caller device is initiating an emergency call.

* * * * *